United States Patent
Miller

(10) Patent No.: US 6,736,686 B2
(45) Date of Patent: May 18, 2004

(54) MOTORBOAT PROPELLER SAFETY ENCLOSURE

(76) Inventor: Lynn George Miller, 1570 E. Amblewood La., Holladay, UT (US) 84117

( * ) Notice: Subject to any disclaimer, the term of this patent is extended or adjusted under 35 U.S.C. 154(b) by 0 days.

(21) Appl. No.: 09/911,971

(22) Filed: Jul. 23, 2001

(65) Prior Publication Data

US 2003/0017763 A1 Jan. 23, 2003

(51) Int. Cl.⁷ ............................................... B63H 5/16
(52) U.S. Cl. ................................................... 440/71
(58) Field of Search ............................ 440/71, 72, 49; 383/127; 220/402, 403; 248/97, 99

(56) References Cited

U.S. PATENT DOCUMENTS

| | | | |
|---|---|---|---|
| 1,879,410 A | * 9/1932 | Morris et al. | 493/480 |
| 2,164,641 A | * 7/1939 | Davenport | 383/127 |
| 2,755,896 A | * 7/1956 | Breglia | 116/2 |
| 3,870,875 A | 3/1975 | Altimus | 240/2 R |
| 3,915,329 A | * 10/1975 | Zaks | 220/908 |
| 3,939,795 A | 2/1976 | Rocka | 115/17 |
| 3,993,016 A | * 11/1976 | Pulaski | 116/2 |
| 4,014,157 A | * 3/1977 | Pearce | 248/154 |
| 4,026,233 A | 5/1977 | Cox | 114/229 |
| 4,210,186 A | * 7/1980 | Belenson | 383/16 |
| 4,586,909 A | 5/1986 | Rosato | 440/112 |
| 4,628,007 A | * 12/1986 | Ledsham | 428/542.8 |
| 4,708,673 A | 11/1987 | Dunham et al. | 440/77 |
| 4,842,228 A | * 6/1989 | Kasper | 248/97 |
| 4,979,833 A | * 12/1990 | Cook | 383/117 |
| 5,116,267 A | 5/1992 | Olson | 440/56 |
| 5,135,358 A | 8/1992 | Myers | 416/245 A |
| 5,222,802 A | * 6/1993 | Beck | 383/127 |
| 5,226,554 A | * 7/1993 | Dauphinais | 248/95 |
| 5,273,399 A | * 12/1993 | Ojeda | 440/49 |
| 5,315,949 A | 5/1994 | Bradley | 114/222 |
| 5,407,372 A | 4/1995 | Mondek et al. | 440/52 |
| 5,409,409 A | 4/1995 | Blanchard et al. | 440/54 |
| 5,470,262 A | 11/1995 | Bustillo, Sr. | 440/72 |
| 5,476,184 A | * 12/1995 | Hill | 383/127 |
| 5,527,193 A | 6/1996 | Doelcher | 440/49 |
| 5,562,511 A | 10/1996 | Blanchard et al. | 440/49 |
| 5,613,886 A | 3/1997 | Cribbs | 440/2 |
| 5,660,136 A | 8/1997 | Pignatelli et al. | 114/361 |
| 5,664,975 A | 9/1997 | Carlisle | 440/49 |
| 5,791,955 A | 8/1998 | Rinck | 440/113 |
| 6,092,932 A | * 7/2000 | Pekala et al. | 383/127 |
| 6,152,064 A | * 11/2000 | Morton | 114/361 |

* cited by examiner

Primary Examiner—S. Joseph Morano
Assistant Examiner—Lars Olson
(74) Attorney, Agent, or Firm—Lloyd W. Sadler

(57) ABSTRACT

A boat propeller safety enclosure for the covering of the propeller of a boat during road transportation, which enhances the ability of those following the trailered boat to avoid contact with the propeller, is provided. This enclosure has a cinchable opening for ease of attachment and removal and for tightly fitting about a propeller. A reflective and/or brightly colored surface is provided.

10 Claims, 7 Drawing Sheets

MOTORBOAT PROPELLER SAFETY ENCLOSURE

BACKGROUND OF INVENTION

1. Field of the Invention

This invention relates to the field of boat safety devices. More specifically, this invention relates to safety enclosures adapted to fit over the propeller during the transport of the motorboat out of the water.

2. Description of Related Art

A variety of devices have been proposed to provide covers, enclosures or other accessories that are designed to be placed on or around the drive unit of a motorboat. However, generally such devices do not provide minimal air resistance while ensuring visual cues to traffic followers of the transported motorboat.

The reader is referred to the following U.S. patent documents for general background material. Each of these patents is hereby incorporated by reference in its entirety for the material contained therein.

U.S. Pat. No. 3,870,875 describes a cover for covering the propeller and rear drive assembly of an outboard-inboard motorboat.

U.S. Pat. No. 3,939,795 describes a protective cover for the lower portion of an outboard motor.

U.S. Pat. No. 4,026,233 describes a portable, safety hull cover for a marine vessel or the like which may be quickly deployed from a vessel which has sustained hull damage that destroys the water-tight integrity of the hull.

U.S. Pat. No. 4,586,909 describes a cover designed for the majority of MerCrusier inboard/outboard motor bell housings, which is conveniently attached using the existing studs exposed when the lower unit is removed.

U.S. Pat. No. 4,708,673 describes an outboard motor cowl assembly.

U.S. Pat. No. 5,116,267 describes a yieldable protective mounting mechanism for trolling motors that incorporates a mounting base that is fixed to the deck structure or the stern structure of a small boat.

U.S. Pat. No. 5,135,358 describes a marine propeller theft deterrent system designed for use on a conventional propeller assembly.

U.S. Pat. No. 5,315,949 describes an apparatus for protectively covering an outcropping, such as a motor prop of a boat.

U.S. Pat. No. 5,407,372 describes an outboard motor cover assembly.

U.S. Pat. No. 5,409,409 describes a marine apparatus comprising a boat hull, including opposed walls extending generally in the fore and aft direction, and a mounting bracket connected to the walls for supporting a propulsion unit for pivotal movement relative to the boat about a generally horizontal axis.

U.S. Pat. No. 5,470,262 describes a propeller enclosure for enclosing a skeg and propeller. The invention includes a fence portion, which defines a first chamber.

U.S. Pat. No. 5,527,193 describes a hand-insertable, rigid plastic cover for use with an individual boat blade of a propeller of an in-board or outboard boat motor wherein each cover of the invention is integrally formed as a single unit using of a conventional plastic material such as polyethylene.

U.S. Pat. No. 5,562,511 describes a marine apparatus that comprises a boat, including a hull, an outboard motor, and mounted on the hull for pivotal movement relative thereto between a trimmed-in position, a tilted-up portion, and a trimmed-out position between the trimmed-in position and the tilted-up position, a cover which extends above the propulsion unit and which is mounted on the hull for movement relative thereto.

U.S. Pat. No. 5,613,886 describes an outboard-motor-mounted safety light apparatus for an outboard motor and includes an electrical lamp assembly, and attachment assembly, and an electrical power connection.

U.S. Pat. No. 5,660,136 describes a collapsible cover for the drive unit of an outboard or stern drive boat.

U.S. Pat. No. 5,664,975 describes a reflective propeller safety cover comprising a bag having a flat bottom wall and a side wall peripherally coupled thereto and extended therefrom to define a hollow interior sized for holding a propeller of a motor boat and a mouth for allowing access to the interior for receiving a propeller.

U.S. Pat. No. 5,791,955 describes a cover used for boat drive units, at least portions of which are disposed outside the hull of a boat.

SUMMARY OF INVENTION

It is desirable to provide a motorboat propeller safety enclosure. It is particularly desirable to provide a motorboat propeller safety enclosure that provides a visual cue to followers in traffic thereby helping to avoid collisions between trailered and towed motorboats and following vehicles in traffic. It is also desirable to provide a motorboat propeller safety enclosure that has minimal air resistance and facilitates the evacuation of water from the enclosure.

Accordingly, it is an object of this invention to provide an enclosure adapted to enclose the propeller rotor of a motorboat that enhances the visibility of the propeller when the trailered boat is being towed.

A further object of this invention is to provide an enclosure adapted to enclose the propeller rotor of a motorboat, which includes a highly visible feature.

A still further object of this invention is to provide an enclosure adapted to enclose the propeller rotor of a motorboat, which made of mesh material in order to minimize air resistance and water containment.

Another object of this invention is to provide an enclosure adapted to enclose the propeller rotor of a motorboat, which includes a device for easily attaching, detaching and reattaching the enclosure about the rotor.

Additional objects, advantages, and other novel features of this invention will be set forth in part in the description, drawings and claims that follows, and it part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiments of the invention, simply by way of illustration of one of the modes best suited to carry out this invention. As it will be realized, this invention is capable of other different embodiments, and its several details, and specific electronic circuits, are capable of modification in various aspects without departing from the invention. Accordingly, the drawings and descriptions should be regarded as illustrative in nature and not as restrictive.

To achieve the foregoing and other objectives, and in accordance with the purposes of the present invention, the enclosure of this invention is made of a bright mesh material and may include a reflective strip or region. The means for fixing the enclosure about the propeller rotor is, in one embodiment, a slip-lock fastener, and, in another embodiment, a hook and loop fastener.

BRIEF DESCRIPTION OF DRAWINGS

The accompanying drawings incorporated in and forming a part of the specification, illustrate a preferred embodiment of the present invention. Some, although not all, alternative embodiments are described in the following description. In the drawings.

Reference will now be made in detail to the present preferred embodiment of the invention, an example of which is illustrated in the accompanying drawings.

DETAILED DESCRIPTION

This invention is a device for enclosing the propeller of a motorboat during road transport of a trailered boat, which provides visual safety cue for the drivers of vehicles following the trailered boat down the road. In the preferred embodiments of this invention the cover of this invention has a reflective surface, pattern or in the alternative a brightly colored material that enhances the visibility of the cover. The cover of this invention preferably is also provided with a device for fixing the cover about the propeller.

Figure 1:
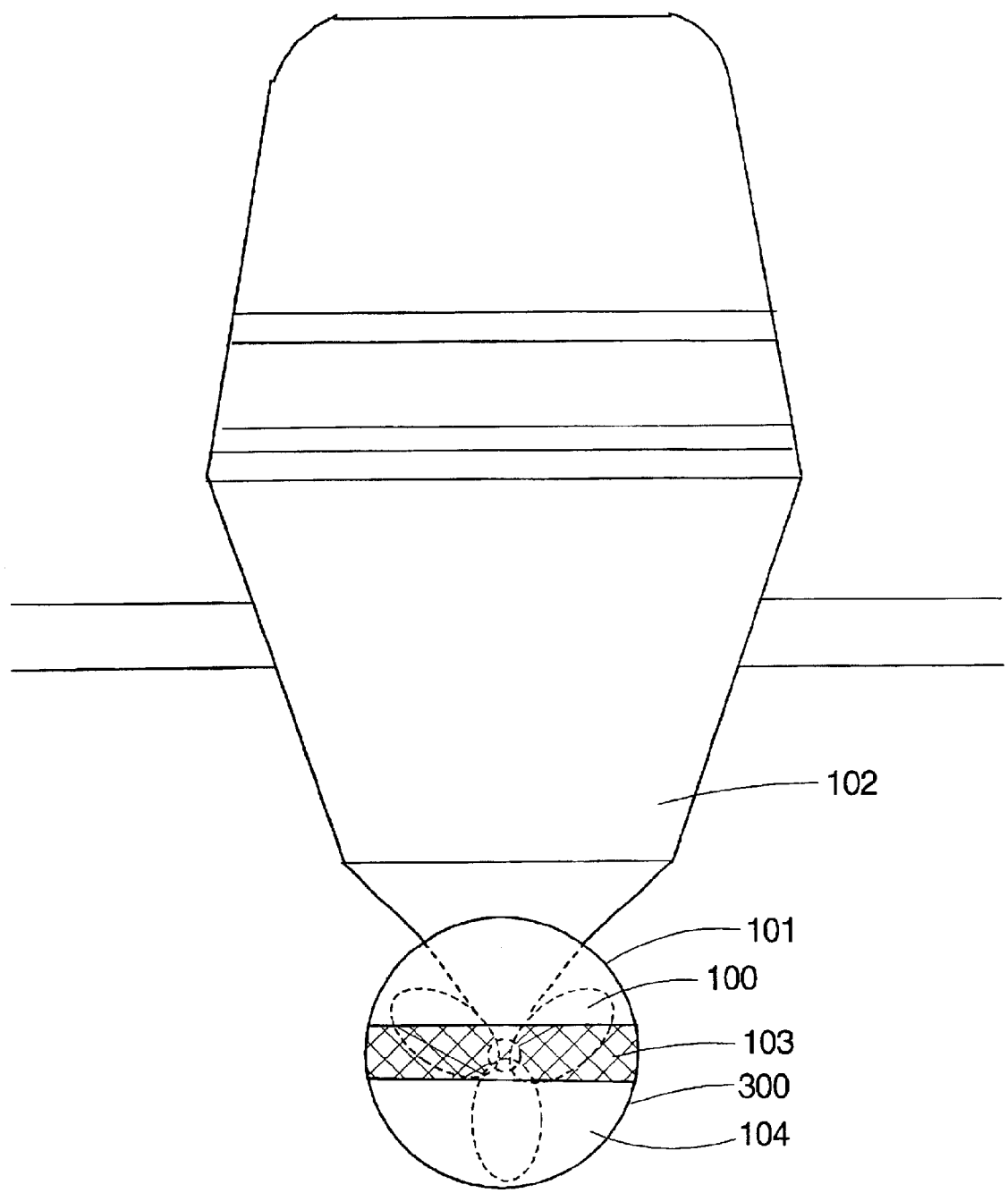
FIG. 1 is a perspective view of the invention as installed on a representative motorboat propeller.

FIG. 1 shows a perspective view of a first preferred embodiment 101 of the invention as installed on a representative motorboat propeller 100. The motor 102 having a propeller 100 attached in the standard manner is shown with the cover 101 fixed in place about the propeller 100. The cover 101 has a central panel 103, which is made of a bright colored material or more preferably a reflective material. The cover 101 is made a flexible cloth or cloth-like material, preferably selected from canvas, vinyl, nylon, denim and other heavy weight materials. The central panel 103 is preferably made from reflective material or in the alternative is painted with reflective or brightly colored paint. The first side 104 is held in a generally circular shape by a hard panel insert 300. The insert 300 is cut to a generally circular shape and is preferably made of a hard plastic sheet. Alternative embodiments of this invention may use an insert made of a Plexiglas, metal, rubber or a synthetic material. The preferred material of the insert 300 will be generally water resistant, with good strength and high rigidity.

Figure 2:
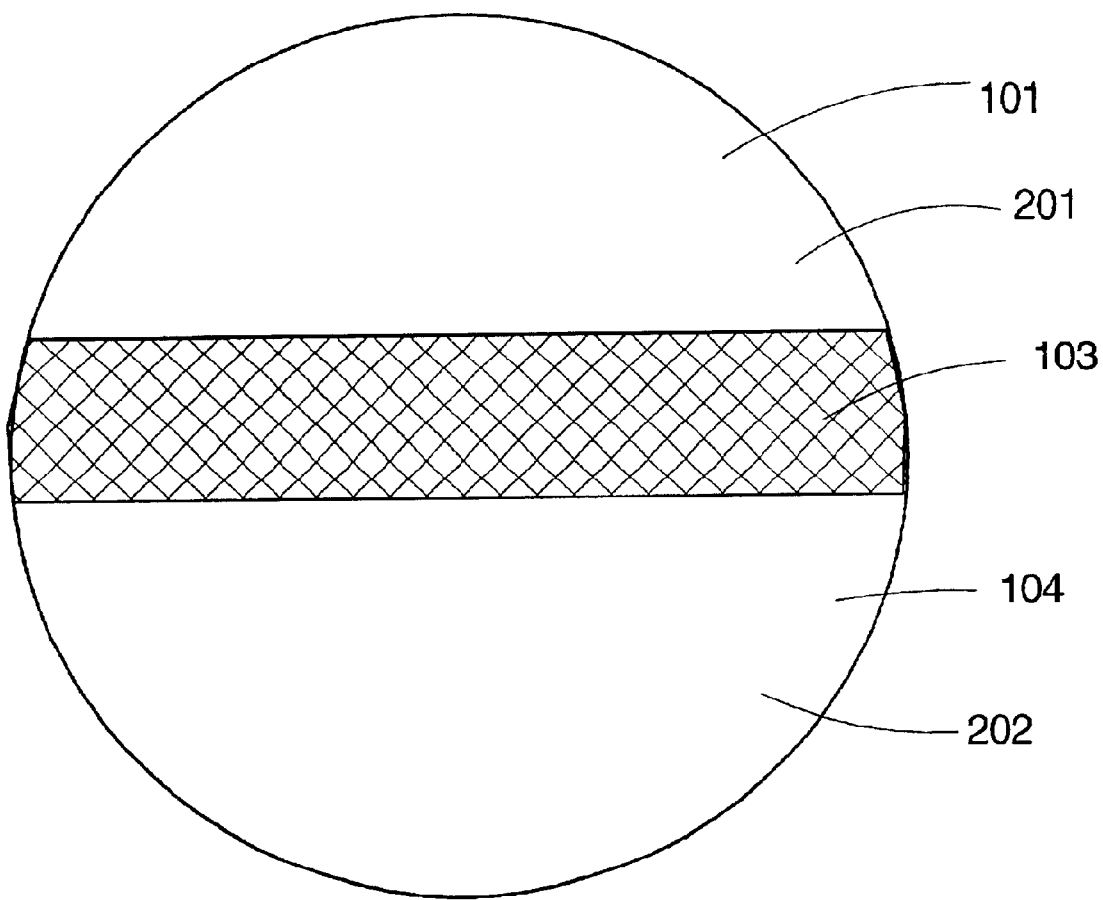
FIG. 2 is a first end view of a present preferred embodiment of the invention.

FIG. 2 shows the first side 104 view of the first present preferred embodiment 101 of the invention. This view shows that the preferred cover 101 of this invention has a top panel 201 and a bottom panel 202 separated by the reflective panel 103. In alternative embodiments of this invention, the reflective panel 103 may be replaced with bright or reflective writing or symbology.

Figure 3:
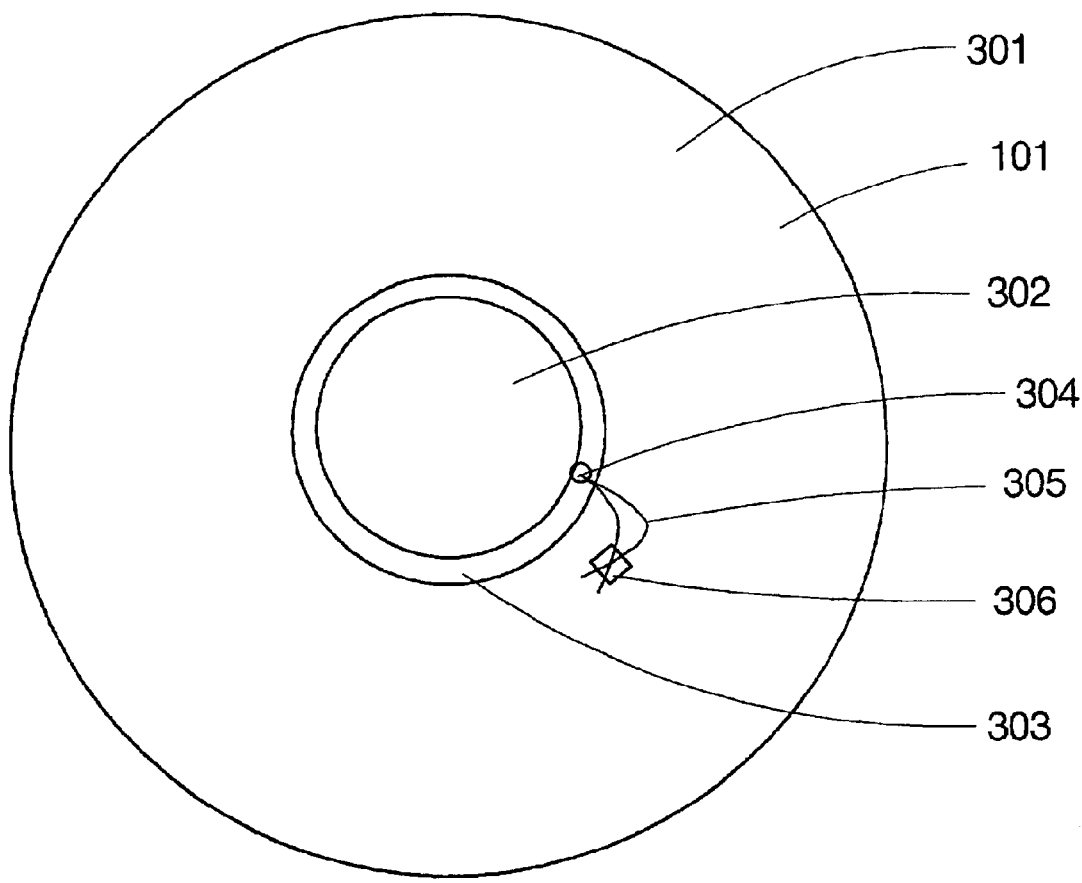
FIG. 3 is a second end view of the present preferred embodiment of the invention.

FIG. 3 shows the second end or rear view of the first present preferred embodiment 101 of the invention. The side panel 301 is shown with an opening 302 for receiving the propeller 100. The insert 300 is shown within the cover 101, visible through the opening 302. A cinch region 303 surrounds the opening 302 and is adapted to be easily opened further and or cinched tight. The present preferred cinch region 303 is a loop of fabric with string, lace or rope segment 305 or the like within the loop of fabric with the ends of the segment 305 extending out of an opening 304 in the cinch region 303. Preferably, a releasable cinch lock 306 is attached to the segment 305 to provide a way to easily lock the segment 305 in place and to maintain the size of the opening 302. In alternative embodiments the opening 301 size may be maintained by simply tying the segment 305 ends together.

Figure 4:
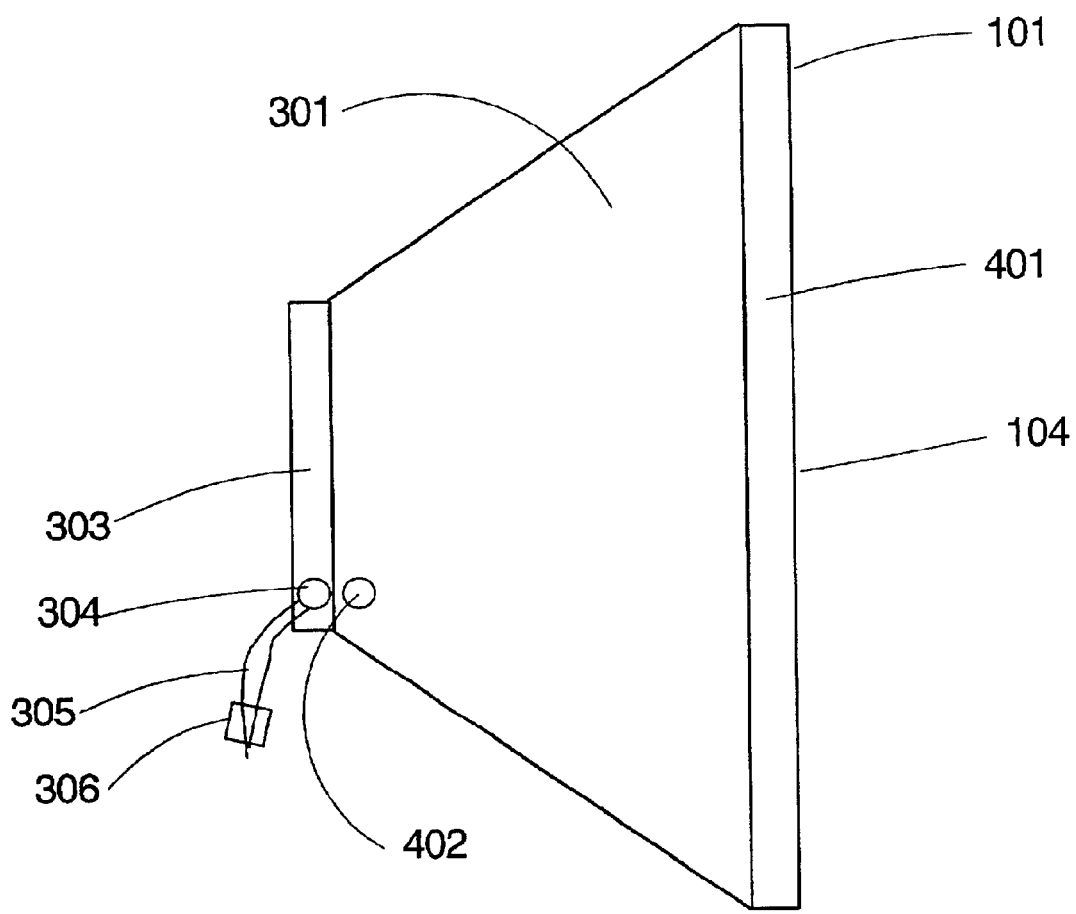
FIG. 4 is a side view of the present preferred embodiment of the invention.

FIG. 4 shows the side view of the present preferred embodiment 101 of the invention. This view shows the generally conic shape of this embodiment 101 of the invention when installed on a propeller 100 with the cinch region 303 tightened. The panel insert 300 serves to create a flat first side 104 and a circular side 401. A second opening 402 may also be provided to facilitate drainage.

Figure 5:
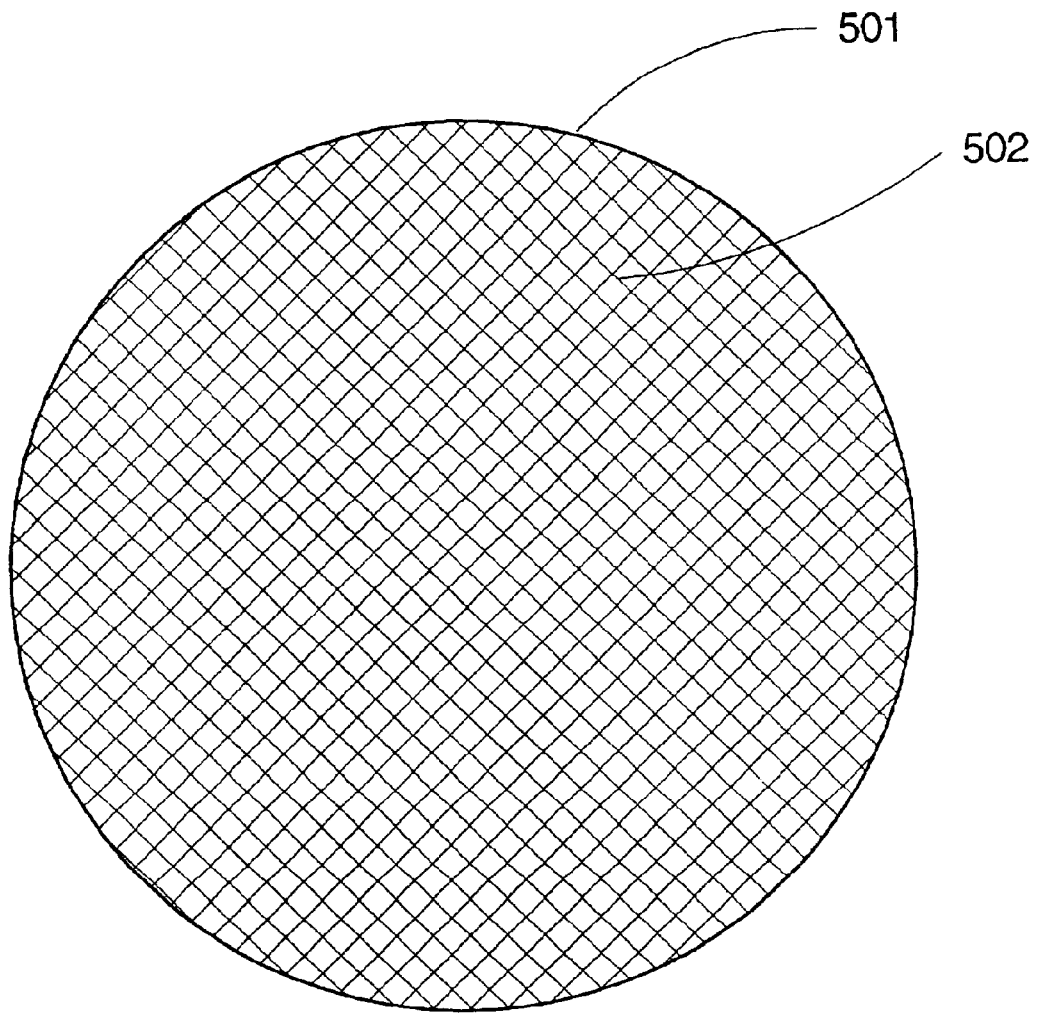
FIG. 5 is a first end view of an alternative embodiment of the invention.

FIG. 5 shows a first end view of a preferred alternative embodiment 501 of the invention. This embodiment 501 is made of a nylon or other similar mesh material and is typically provided without the insert panel.

Figure 6:
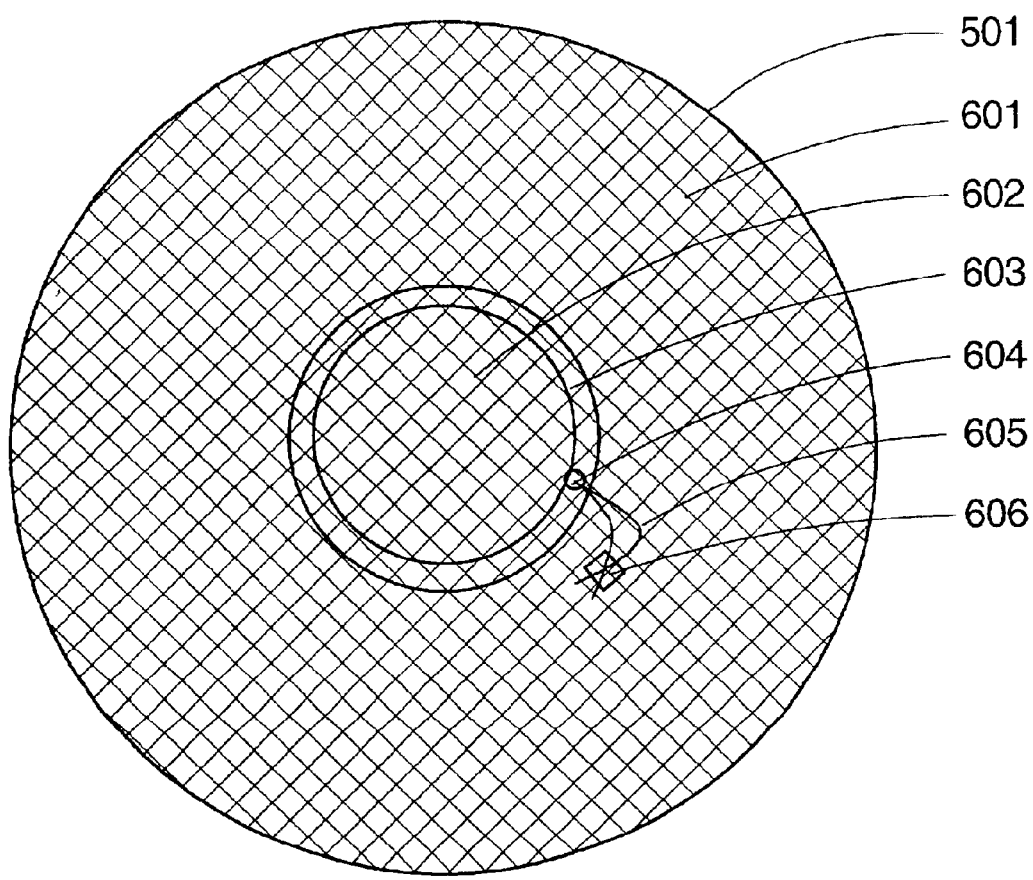
FIG. 6 is a second end view of the alternative embodiment of the invention.

FIG. 6 shows a second end view of the preferred alternative embodiment 501 of the invention. This view shows the side section 601, the cinch region 603, which is preferably similar to the cinch region 303 of the first embodiment 101. The size of the propeller 100 receiving opening 602 is defined by the cinch region 603, which in turn is preferably held in place by a string segment 605, the ends of which extend through an opening and are locked by a segment lock 606.

Figure 7:
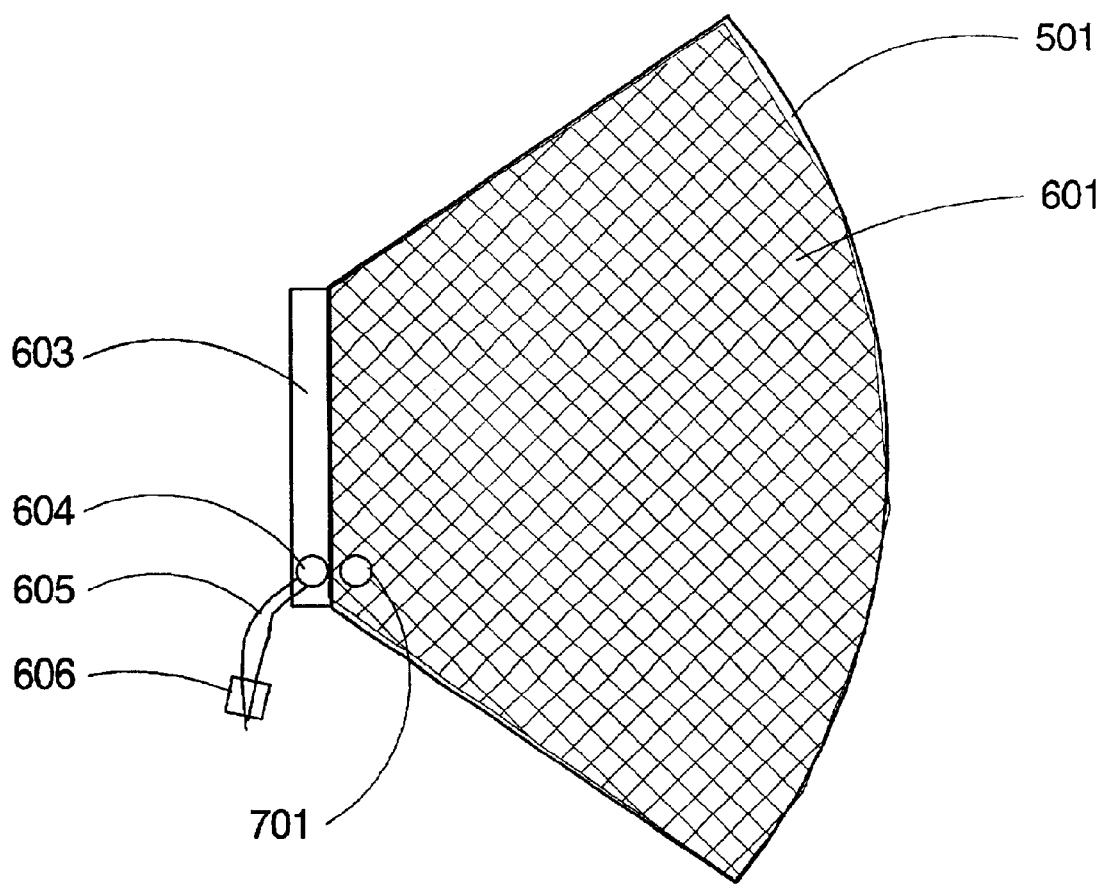
FIG. 7 is a side view of the alternative embodiment of the invention.

FIG. 7 shows a side view of the preferred alternative embodiment 501 of the invention and shows that this embodiment when installed on a propeller 100 and cinched tightly tends to adopt the general shape of the propeller.

The previous described preferred embodiments of the invention are to be considered in all respects only as illustrative and not as restrictive. Although the embodiments shown describe particular components in particular connection configurations, the invention is not limited thereto. The scope of this invention is indicated by the appended claims rather than by the foregoing description. All systems and devices, which come directly within the claims or within the meaning and range of equivalency of the claims, are to be embraced as being within the scope of protection of this invention.

What is claimed is:

1. A boat propeller safety enclosure, comprising:
   (A) a cover having a first side having a shape and a second side having an opening having an adjustable size, and having a second opening for drainage;
   (B) an hard circularly shaped insert panel within said cover, adjacent to said first side serving to create said first side as flat and defining said shape of said first side as a circular shaped first side;
   (C) a cinch region on said second side of said cover, said cinch region defining said size of said opening.

2. A boat propeller safety enclosure, as recited in claim 1, wherein said cover is made from a material selected from the group consisting of canvas, nylon, vinyl, denim end plastic.

3. A boat propeller safety enclosure, as recited in claim 1, further comprising a reflective device on said first side of said cover.

4. A boat propeller safety enclosure, as recited in claim 1, further comprising a brightly colored device on said first side of said cover.

5. A boat propeller safety enclosure, as recited in claim 1, wherein said insert panel is composed of a material selected from the group consisting of plastic, Plexiglas, rubber and metal.

6. A boat propeller safety enclosure, as recited in claim 1, wherein cinch region further comprises:
   (1) a loop of fabric;
   (2) an opening for access to the interior of said loop of fabric;
   (3) a tying device, generally within said loop of fabric and having a first end and a second end extending out of said opening; and
   (4) a releasable lock device fitted to said first end and said second end of said tying device.

7. A boat propeller safety enclosure, comprising:
   a generally bag shaped cover having an opening and comprising a mesh material and having a cinch region defining said opening, and wherein said bag shaped cover is sized and shaped, by the insertion within said bag shaped cover of a hard circularly shaped panel insert, adjacent to a first side of said cover, said hard circularly shaped panel insert forcing said first side to be flat and to adopt the general circular shape of a propeller when installed and cinched tightly about the propeller.

8. A boat propeller safety enclosure, as recited in claim 7, wherein said mesh material is a brightly colored nylon mesh.

9. A boat propeller safety enclosure, as recited in claim 7, wherein said mesh material has a reflective region.

10. A boat propeller safety enclosure, as reciting in claim 7, wherein said cinch region further comprises:
   (1) a loop of fabric;
   (2) an opening for access to the interior of said loop of fabric;
   (3) a tying device, generally within said loop of fabric and having a first end and a second end extending out of said opening; and
   (4) a releasable lock device fitted to said first end and said second end of said tying device.

* * * * *